United States Patent [19]

Berthollet

[11] Patent Number: 4,494,325

[45] Date of Patent: Jan. 22, 1985

[54] SHRUB-LIFTING MACHINE WITH PISTON CONTROLLED ANCHOR

[75] Inventor: Pierre Berthollet, Cognin, France

[73] Assignee: Societe A.C.B., Cognin, France

[21] Appl. No.: 539,911

[22] Filed: Oct. 7, 1983

[51] Int. Cl.³ .............................................. A01G 23/06
[52] U.S. Cl. ...................................... 37/2 R; 414/718
[58] Field of Search .......................... 37/2 R; 414/718

[56] References Cited

U.S. PATENT DOCUMENTS

| 2,701,657 | 2/1955 | Sherman | 414/718 |
| 3,760,515 | 9/1973 | Morgan | 37/2 R |
| 4,332,093 | 6/1982 | Berthollet | 37/2 R |
| 4,417,416 | 11/1983 | Johnson | 37/2 R |

FOREIGN PATENT DOCUMENTS 482150 12/1975 U.S.S.R. ................................ 37/2 R

Primary Examiner—E. H. Eickholt
Attorney, Agent, or Firm—Karl F. Ross

[57] ABSTRACT

A machine for removing a plant from the ground with a root ball intact as in U.S. Pat. No. 4,332,093 has its tool support mounted on the tractor via a guide arrangement which allows the tractor to continue its travel as the tool support is immobilized via a fluid-operated anchor during the root ball separation operation.

18 Claims, 8 Drawing Figures 4,494,325

SHRUB-LIFTING MACHINE WITH PISTON CONTROLLED ANCHOR

FIELD OF THE INVENTION

My present invention relates to a shrub-lifting machine and, more particularly, to a machine to uproot or lift shrubs, trees or other plantings with a root ball to enable their transplantation from one site to another.

BACKGROUND OF THE INVENTION

My U.S. Pat. No. 4,332,093 describes a machine which is capable of being moved to the site of a planting, is adapted to undercut a root ball to separate the root ball from the surrounding soil, and to lift the plant with its root ball from the ground for transportation to another site at which the root ball can be wrapped or replanted.

The essential elements of this machine are a tractor or other vehicle, provided with a three-point hitch or like hydraulically controlled structure which can be raised and lowered, a support mounted on this hitch and which can be raised and lowered thereon, and a single spade blade carried by a tool holder on this support which is in the form of a crown and can be given a rotatable movement about its vertical axis so that the spade can reach below the roots of the plant and, upon rotation of the crown, can cut loose a root ball and the plant from the soil.

The spade blade is a single blade rigid with the rotatable crown which has an opening, i.e. is C-shaped, and can be rotated in a C-shaped support crown which is fixed to the chassis and has an opening whose angular extent is substantially equal to that of the rotatable crown. When the inner rotatable crown has its opening aligned with the support crown, i.e. the outer crown, the machine has a C-shaped configuration enabling it to be passed around the plant so that the plant can be centered within the crown to permit the blade to be driven into the ground, e.g. by the tractor movement and then enabling the movable crown to be rotated to free the root ball.

One of the disadvantages of this machine is that it requires the tractor to be brought to a standstill during the operation of the spade blade, i.e. during the portion of the operation of the apparatus in which the root ball is severed from the ground. This means that the tractor must be started and stopped many times in the course of use of the machine, thereby causing deterioration of the vehicle or requiring excessive repair or maintenance procedures.

OBJECTS OF THE INVENTION

It is the principal object of the present invention to improve upon the machine described in my U.S. Pat. No. 4,332,093 and, in particular, to increase the versatility thereof.

A more specific object of this invention is to provide an improved machine for the removal of a plant together with its root ball around the roots thereof from a planting site so that the starting and stopping of the vehicle carrying the machine can be minimized or eliminated.

Still another object of this invention is to provide a machine of the character described in which the vehicle, namely, the tractor, can continue its movement during the separation of the root ball from the ground so that the operation can be more or less continuous and deterioration of the tractor does not occur prematurely.

SUMMARY OF THE INVENTION

These objects and others which will become apparent hereinafter are attained, in accordance with the present invention, by providing a tool support and spade blade in the manner described and by mounting this tool support on a carriage which is longitudinally shiftable on a body mounted on the hitch of the tractor, means being provided to anchor the carriage to the ground so that, while the spade blade is in operation, the tractor can continue its progress and the body can move past the planting site while the tool support remains in place and, after the plant has been lifted from the ground, the tool support can be displaced forwardly again on the body while the vehicle continues its forward movement so that the tool support will again be in a position to be held stationary while the tractor continues its forward displacement.

The body can be provided with guideways for slide blocks on the tool support to enable this longitudinal movement and two fluid-operated cylinders can be provided, one for control of the anchoring means while the other serves to displace the tool support forwardly on the aforementioned body.

The tool support and tool can be of the construction described in the aforementioned patent with all of the degrees of mobility thereof in addition to being displaceable relative to the body.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
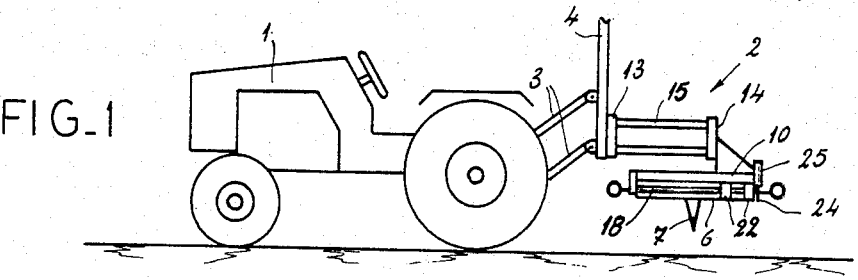
FIG. 1 is a side-elevational view diagrammatically illustrating the apparatus of the present invention wherein the tool support is disposed directly behind the tractor for transportation to a location at which a plant is to be removed from the ground.

In the drawing, I have shown a tractor 1 which is provided with a machine 2 for cutting the root ball of a plant 3 from the ground utilizing the principles described in my aforementioned U.S. patent. The machine 2 is connected to the tractor by a conventional three-point hitch represented at 3.

The root ball cutting machine 2 has three essential parts, namely, a vertical front frame 4, a central portion 5 and a tool holder 6 which can have the construction described in the aforementioned patent and can be equipped with a spade blade 7 rotatable on an internal crown in an outer crown as described in that patent and not shown in any detail herein. It suffices to note that when the two crowns are properly aligned, they form a C-shaped structure which can be opened forwardly and which can receive the stalk, stump or trunk of a shrub or tree below which the spade blade 7 can be drawn by the forward motion of the tractor. This C-shaped structure can be swung about a vertical axis offset from the opening as described in the patent but not shown here.

The front frame 4 is formed by upright and transverse (horizontal) bars and is hingedly connected at 8 to the three-point hitch. It carries a trunion 9 which forms a pivot 16 for a support plate 13 enabling the tilting of this support plate about a longitudinal horizontal axis. The tilting movement of this support plate is effected by a hydraulic cylinder 12 whose cylinder body can be pivotally connected to the frame while its piston rod is pivotally connected to a lateral extension 17 of the plate 13.

The central part of the machine is constituted by a so-called deformable quadrilateral, i.e. parallelogrammatic linkage in which the support plate 13 constitutes the forward member of the linkage and a rear plate 14 constitutes the rear element of the linkage. The rear element 14 has a vertical plate 14a and a horizontal plate 14b interconnected by gusset plates 14c.

The front plate 13 is pivotally connected to the rear plate 14 by mutually parallel bars 15 and appropriate pivots defining the parallelogrammatic linkage.

It will be evident, therefore, that the hydraulic cylinder 12 not only tilts the front plate 13 about the axis 16, but, indeed, can tilt the entire parallelogrammatic linkage 15 about a longitudinal axis. This enables modification of the orientation or, more precisely, the inclination of the body 5 with respect to the vertical frame 4.

The plates 14a and 14b of the rear element 14 of the parallelogrammatic linkage carries a housing 10 which extends longitudinally and can be supported by rollers 20 on the ground, the housing 10 defining a pair of mutually parallel horizontal guides 18 in which guide blocks 22 affixed to the tool carrier 6 can be longitudinally guided.

Figure 5:
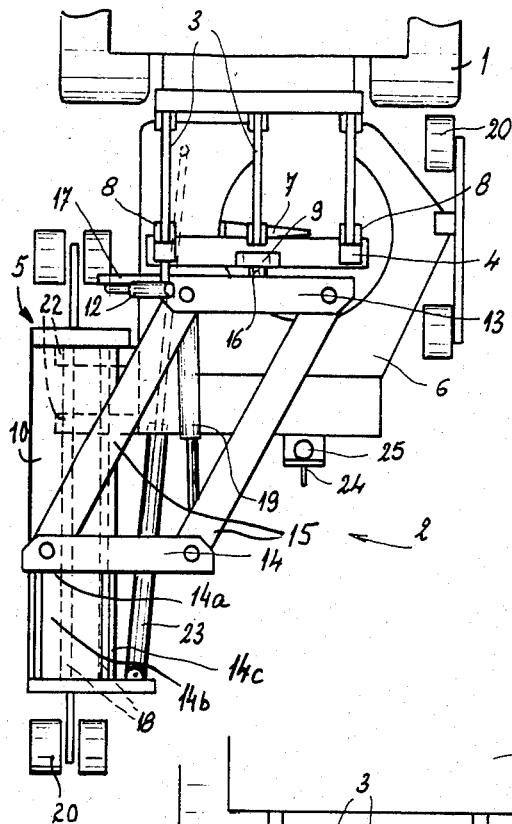
FIG. 5 is a detailed plan view showing the machine in its travel position.
Figure 6:
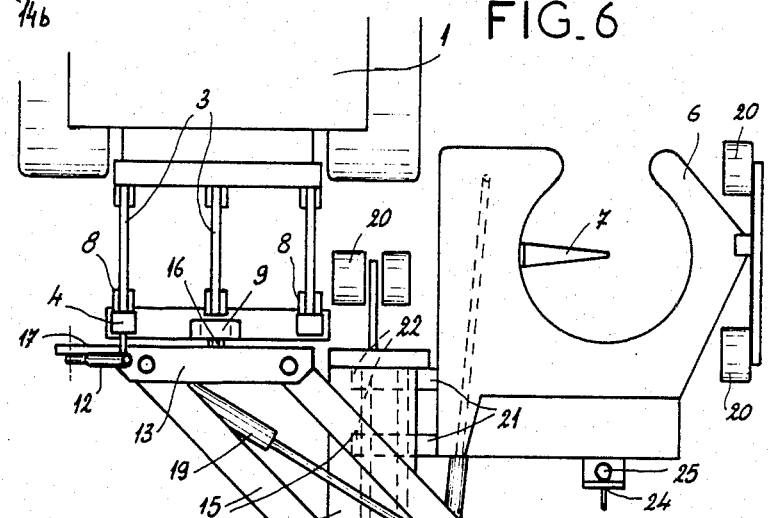
FIG. 6 is a detailed plan view showing the position of the tool holder to the side.
Figure 7:
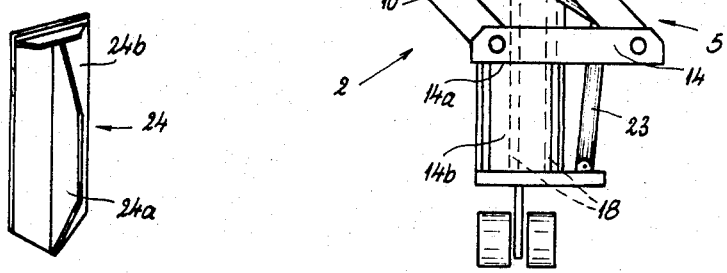
FIG. 7 is a perspective view of the anchor.
Figure 8:
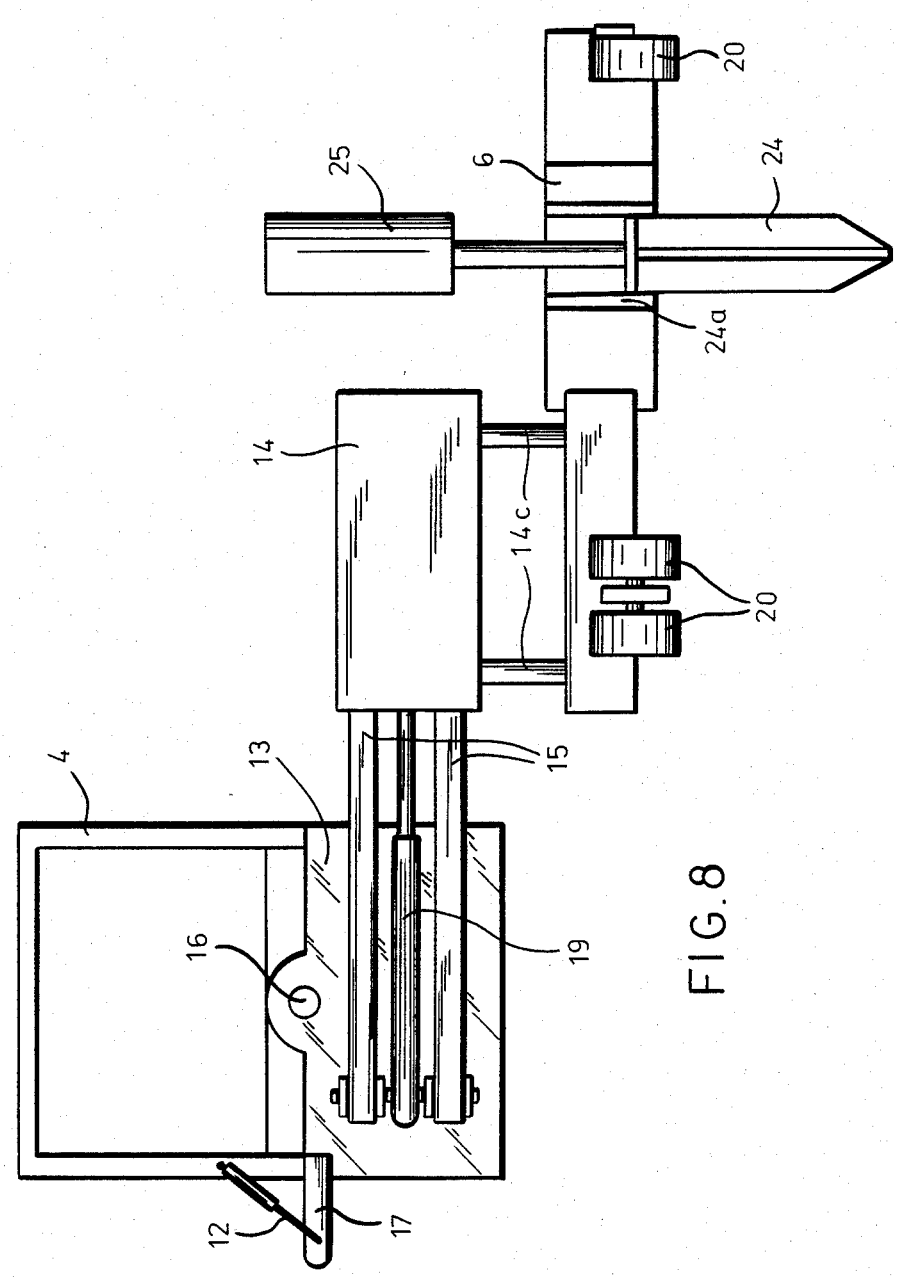
FIG. 8 is a rear-elevational view of the apparatus with the tool holders swung to the side.

The parallelogrammatic linkage is provided with a hydraulic cylinder 19 which enables the linkage to swing between the positions shown in FIGS. 5 and 6, the cylinder bridging by a variable length element diagonally opposite pivots of the parallelogrammatic linkage.

The vertical frame 4 is therefore attached to the tractor and can be raised and lowered thereon via the three-point hitch and the normal hydraulic controls of the tractor while the second part of the machine 5 is connected to the first through the parallelogrammatic linkage allowing the third part of the machine, namely, the tool carrier 6 to be swung from a position in which the tool carrier lies behind the tractor (FIG. 5) for travel, into the position shown in FIG. 6 in which the tool carrier is disposed laterally of the path of the tractor and can be drawn around a plant.

The tool holder 6 is also provided with wheels 20 which permit the tool carrier to be supported on the ground and with a pair of arms 21 terminating in the slide blocks 22 which ride in the tracks 18. A hydraulic cylinder 23 is also provided between the housing 10 and the tool carrier 6 and is pivotally connected to each of them so that upon extension of the cylinder, the tool holder can be advanced relative to the housing 10 and thereby position the tool holder so that, once it is seated in the ground, the housing 10 can pass thereby and the tractor can continue its advance while the root ball is cut loose.

The tool holder 6 is also provided with an anchoring mechanism which can comprise an anchor spike 24 mounted vertically and slidably in a fixed support 24a while a hydraulic cylinder 25 can be actuated to drive this anchor into the ground and to withdraw the anchor from the ground.

In the position of the tool holder 6 with respect to the housing 10, the assembly can be swung inwardly directly behind the tractor (FIG. 5) to enable the tractor to travel to any particular location at which a plant is to be removed from the ground, e.g. by highway or road, the parallelogrammatic linkage correspondingly permitting this travel position to be achieved. In this position, the machine does not project significantly outwardly from the outline of the tractor. The travel position has also been shown in FIG. 1.

Figure 2:
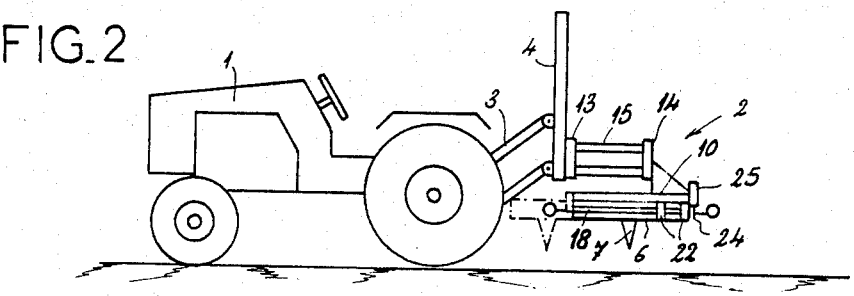
FIG. 2 is a similar view in which the tool support has been swung to the side to enable the tool support to be advanced relative to its body (dot-dash lines) and encircle the plant.

When the machine is to be prepared for detaching a plant from the ground, the hydraulic cylinder 19 is actuated to swing the tool holder 6 outwardly, i.e. into the positions shown in FIGS. 6 and 2, enabling the opening of the crowns to be aligned with a row of plants to be extracted. Simultaneously, using the cylinder 23, the tool holder 6 is moved forwardly as shown in dot-dash lines in FIG. 2 and as has been illustrated in solid lines in FIG. 6.

Figure 3:
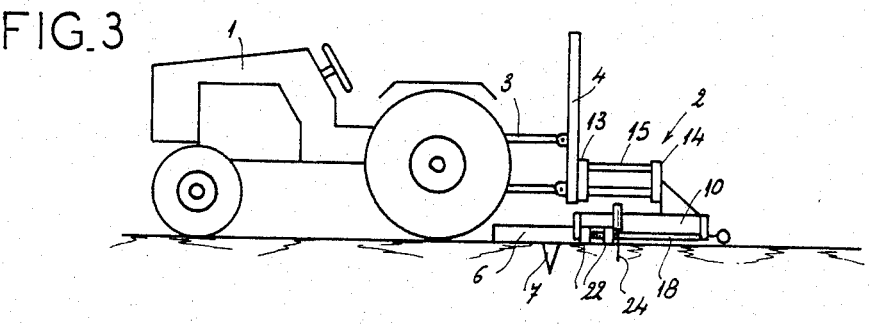
FIG. 3 is still another side-elevational view diagrammatically showing the position of the apparatus after the tool support has been lowered and encircles the plant, preparatory to rotation of the spade blade.
Figure 4:
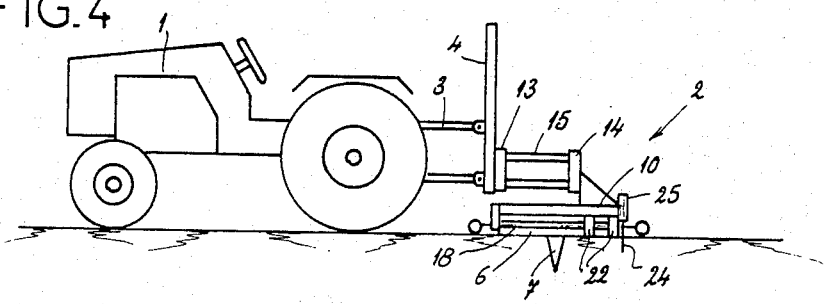
FIG. 4 is a similar view showing the position of the various parts as the body has advanced during the root ball cutting process, it being understood that FIGS. 1–4 show successive positions of the tractor which continues its movement in the direction of travel, i.e. to the left.

The system is lowered using the three-point hitch and the blade 7 is drawn beneath the plant roots in the manner described in the aforementioned patent and, as the tractor continues its travel (FIGS. 3 and 4) the root ball is cut loose by rotation of the blade about the vertical axis of the crown. The support 6 is prevented from moving during this operation by the anchor 24 which has been inserted into the ground as the tool support was lowered. As the tractor moves forwardly and the support is anchored, there is a relative movement of the housing 10 and the support as can be seen by a comparison of FIGS. 3 and 4. The anchorage has been found to be very effective when the anchor comprises a pair of wings or flanges, one of which extends in the longitudinal direction, namely the flange 24a while another flange or wing 24b extends transversely thereof. The root ball is cut free before the housing 10 reaches the end of its travel and the parallelogrammatic linkage raises the machine while the cylinder 25 retracts the anchor 24. The cylinder 23 can then move the tool support 6 forwardly.

I claim:

1. A machine for separating a plant with a root ball from the ground at a planting site, comprising:
    a tractor having a three-point hitch;
    a body mounted on said hitch and raisable and lowerable thereby;
    a tool support carried by said body and having an opening adapted to receive a plant and a spade blade rotatable about said plant and adapted to penetrate the ground below said plant to cut the plant loose from the ground with a root ball;

guide means interconnecting said body and said tool support for relative longitudinal movement in a direction of displacement of said tractor to enable continued movement of said tractor in said direction upon halting of said tool support at said plant;

an anchor on said tool support engageable in the ground to halt said tool support at said plant;

a first fluid-operated cylinder connecting said body with said tool support to displace said tool support on said body opposite to said relative movement; and a second fluid-operated cylinder connected with said anchor for driving it into and retracting it from the ground.

2. The machine defined in claim 1, further comprising a deformable quadrilateral linkage connecting said body with said hitch formed with a forward element pivotally mounted on said hitch about an axis parallel to said direction.

3. The machine defined in claim 2 wherein said three-point hitch is provided with a vertical frame, said element of said deformable quadrilateral linkage being pivotally mounted on said frame for rotation about said axis.

4. The machine defined in claim 3, further comprising a fluid-operated cylinder connecting said frame with said element for tilting said linkage about said axis.

5. The machine defined in claim 4 wherein said deformable linkage is provided with a further fluid-operated cylinder for displacing said deformable linkage between a position wherein said tool support lies directly behind said tractor and a position in which said tool support is laterally offset from said position.

6. The machine defined in claim 5 wherein said linkage is a parallelogrammatic linkage.

7. The machine defined in claim 6 wherein said body is a housing formed with at least one guideway forming said guide means, said tool support having a guide block slidable in said guideway.

8. The machine defined in claim 7 further comprising rollers connected to said tool support for supporting the same on the ground.

9. The machine defined in claim 8 further comprising wheels supporting said housing on the ground.

10. The machine defined in claim 1 wherein said anchor has a pair of flanges, one of said flanges extending in said direction and another of said flanges lying orthogonal to said one of said flanges.

11. The machine defined in claim 2 wherein said anchor has a pair of flanges, one of said flanges extending in said direction and another of said flanges lying orthogonal to said one of said flanges.

12. The machine defined in claim 3 wherein said anchor has a pair of flanges, one of said flanges extending in said direction and another of said flanges lying orthogonal to said one of said flanges.

13. The machine defined in claim 4 wherein said anchor has a pair of flanges, one of said flanges extending in said direction and another of said flanges lying orthogonal to said one of said flanges.

14. The machine defined in claim 5 wherein said anchor has a pair of flanges, one of said flanges extending in said direction and another of said flanges lying orthogonal to said one of said flanges.

15. The machine defined in claim 6 wherein said anchor has a pair of flanges, one of said flanges extending in said direction and another of said flanges lying orthogonal to said one of said flanges.

16. The machine defined in claim 7 wherein said anchor has a pair of flanges, one of said flanges extending in said direction and another of said flanges lying orthogonal to said one of said flanges.

17. The machine defined in claim 8 wherein said anchor has a pair of flanges, one of said flanges extending in said direction and another of said flanges lying orthogonal to said one of said flanges.

18. The machine defined in claim 9 wherein said anchor has a pair of flanges, one of said flanges extending in said direction and another of said flanges lying orthogonal to said one of said flanges.

* * * * *